US011799148B2

(12) United States Patent
Jeon et al.

(10) Patent No.: US 11,799,148 B2
(45) Date of Patent: Oct. 24, 2023

(54) BATTERY MODULE (71) Applicant: SK On Co., Ltd., Seoul (KR)

(72) Inventors: Hae Ryong Jeon, Daejeon (KR); Seok Min Kim, Daejeon (KR); Myeong Hwan Ma, Daejeon (KR); Seo Roh Rhee, Daejeon (KR); Seung Hoon Ju, Daejeon (KR); Yang Kyu Choi, Daejeon (KR); Dong Ha Hwang, Daejeon (KR)

(73) Assignee: SK ON CO., LTD., Seoul (KR)

(*) Notice: Subject to any disclaimer, the term of this patent is extended or adjusted under 35 U.S.C. 154(b) by 0 days.

(21) Appl. No.: 18/081,854

(22) Filed: Dec. 15, 2022

(65) Prior Publication Data
US 2023/0111662 A1    Apr. 13, 2023

Related U.S. Application Data (63) Continuation of application No. 16/936,795, filed on Jul. 23, 2020, now Pat. No. 11,552,349.

(30) Foreign Application Priority Data

Jul. 23, 2019    (KR) .......................... 10-2019-0088780

(51) Int. Cl.
H01M 10/6554    (2014.01)
H01M 10/653    (2014.01)
H01M 10/613    (2014.01)
H01M 10/655    (2014.01)
H01M 50/20    (2021.01)

(52) U.S. Cl.
CPC ............ H01M 10/6554 (2015.04); H01M 10/613 (2015.04); H01M 10/653 (2015.04); H01M 50/20 (2021.01)

(58) Field of Classification Search
CPC ... H01M 10/6554; H01M 10/613; H01M 10/653; H01M 50/20; H01M 10/655
See application file for complete search history.

(56) References Cited

U.S. PATENT DOCUMENTS

| 9,196,938 B2 | 11/2015 | Yoon |
| 9,689,624 B2 | 6/2017 | Timmons et al. |
| 2011/0189523 A1 | 8/2011 | Eom |

(Continued)

FOREIGN PATENT DOCUMENTS

| CN | 104170156 A | 11/2014 | |
| CN | 105409031 A | 3/2016 | |
| CN | 104617350 B | * 8/2016 | ............. H01M 2220/20 |
| CN | 107431259 A | 12/2017 | |

(Continued)

OTHER PUBLICATIONS

Notice of Allowance for the U.S. Appl. No. 16/936,795 issued by the USPTO on Sep. 20, 2022.

(Continued)

Primary Examiner — Kaity V Chandler
(74) Attorney, Agent, or Firm — IP & T GROUP LLP (57) ABSTRACT A battery module according to an embodiment of the present disclosure includes a plurality of secondary battery cells; and a housing member including a cooling plate member, and a heat conductive member provided between the secondary battery cells and the cooling plate member to form a heat path for transferring heat from the secondary battery cells to the cooling plate member, the housing member having the plurality of secondary battery cells accommodated therein, wherein the heat conductive member is comprised such that a portion of the heat conductive member in contact with a secondary battery cell that is supercooled has a lower thermal conductivity than a remaining portion of the heat conductive member.

13 Claims, 4 Drawing Sheets (56) References Cited

U.S. PATENT DOCUMENTS

| | | |
|---|---|---|
| 2015/0037616 A1 | 2/2015 | Wyatt et al. |
| 2015/0044540 A1 | 2/2015 | Morton et al. |
| 2016/0197385 A1 | 7/2016 | Matsumoto et al. |
| 2016/0222631 A1 | 8/2016 | Kohno et al. |
| 2017/0214104 A1 | 7/2017 | Garfinkel et al. |
| 2018/0062225 A1 | 3/2018 | You et al. |
| 2018/0358592 A1 | 12/2018 | Park et al. |
| 2019/0014690 A1 | 1/2019 | Miura |
| 2019/0157729 A1 | 5/2019 | Yamashita |
| 2021/0028422 A1 | 1/2021 | Kim et al. |
| 2021/0057696 A1 | 2/2021 | Loacker |

FOREIGN PATENT DOCUMENTS

| | | | | |
|---|---|---|---|---|
| CN | 108199113 A * | 6/2018 | | C09K 5/14 |
| CN | 108886121 A | 11/2018 | | |
| CN | 208723044 U | 4/2019 | | |
| CN | 110010996 A * | 7/2019 | | H01M 10/613 |
| CN | 110492035 A * | 11/2019 | | H01M 10/653 |
| CN | 110660938 A * | 1/2020 | | H01M 10/613 |
| CN | 111357149 A * | 6/2020 | | F28F 21/02 |
| CN | 111403853 A * | 7/2020 | | H01M 10/653 |
| DE | 102010028728 A1 | 11/2011 | | |
| JP | 2012028023 A * | 2/2012 | | H01M 50/183 |
| JP | 2017-076504 A | 4/2017 | | |
| KR | 10-2015-0121914 A | 10/2015 | | |
| KR | 10-2018-0085456 A | 7/2018 | | |
| WO | 2012118015 A1 | 9/2012 | | |
| WO | 2013/084937 A1 | 6/2013 | | |

OTHER PUBLICATIONS

Office Action for the Chinese Patent Application No. 202010697155.0 issued by the Chinese Patent Office on Jun. 30, 2023.

\* cited by examiner

BATTERY MODULE

CROSS-REFERENCE TO RELATED APPLICATION(S)

This application is a continuation application of U.S. Pat. Application Serial No. 16/936,795 filed on Jul. 23, 2020, which claims benefit of priority to Korean Patent Application No. 10-2019-0088780 filed on Jul. 23, 2019 in the Korean Intellectual Property Office. The entire disclosure of each of the foregoing applications is incorporated herein by reference in its entirety.

BACKGROUND

1. Field

The present disclosure relates to a battery module.

2. Description of Related Art

As technological developments and demand for mobile devices and electric vehicles increase, demand for secondary batteries as an energy source is rapidly increasing. A secondary battery is a battery capable of repeated charging and discharging due to reciprocal conversion between chemical energy and electrical energy being reversible. A cell body member of the secondary battery refers to a laminated film case protecting an electrode assembly such as a positive electrode, a negative electrode, a separator, an electrolyte, and the like, which are main components of the secondary battery.

However, the electrode assembly generates heat while performing the process of charging and discharging, and an increase in temperature due to heat generation deteriorates the performance of the secondary battery.

Accordingly, the cell body member in which the electrode assembly is accommodated is configured such that a cooling plate member for performing cooling, a heat sink, and the like are connected.

However, there may be a problem in that a form of a heat conductive member capable of mediating the cell body member and the cooling plate member in the prior art does not have optimum cooling performance.

In addition, accordingly, a problem may occur, in that the production cost may increase due to the waste of relatively expensive heat conductive members.

In particular, the plurality of secondary batteries are installed on a housing member to form a battery module, and among these secondary batteries, in the case of a secondary battery adjacent to a sidewall member of the housing member, the sidewall member is exposed to air and is affected by natural cooling, such that a problem of overcooling occurs, compared to other secondary batteries.

Therefore, there is a need and demand for a battery module that overcomes the above problems.

SUMMARY

An aspect of the present disclosure is to provide a battery module capable of inducing uniform cooling between a plurality of secondary battery cells.

Another aspect of the present disclosure is to provide a battery module capable of optimally forming a cooling performance without wasting heat conductive members.

According to an aspect of the present disclosure, a battery module includes: a plurality of secondary battery cells; and a housing member including a cooling plate member provided adjacent to the plurality of secondary battery cells and a heat conductive member provided between the secondary battery cells and the cooling plate member to form a heat path for transferring heat from the secondary battery cells to the cooling plate member, the housing member having the plurality of secondary battery cells accommodated therein, wherein the heat conductive member is provided such that, a portion of the plurality of secondary battery cells, in contact with the secondary battery cell, that is supercooled, have lower thermal conductivity than that of other portions.

Here, the heat conductive member of the battery module according to an embodiment of the present disclosure may be configured such that a portion of the plurality of secondary battery cells, in contact with the secondary battery cell, that is supercooled, comprises a material having thermal conductivity at least 0.5 times lower than that of other portions.

According to another aspect, the heat conductive member of the battery module according to an embodiment of the present disclosure may be configured such that a portion of the plurality of secondary battery cells, in contact with a secondary battery cell, that is supercooled, are formed of the same material as the other portions, and pores (gas pockets) are formed therein.

According to an aspect of the present disclosure, a battery module may include: a plurality of secondary battery cells; and a housing member including a cooling plate member provided adjacent to the plurality of secondary battery cells and a heat conductive member provided between the secondary battery cells and the cooling plate member, to form a heat path, transferring heat from the secondary battery cells to the cooling plate member, the housing member having the plurality of secondary battery cells accommodated therein, wherein the heat conductive member may include a central heat conductive portion provided to be biased to a bottom central portion of the housing member and an edge heat conductive portion provided to be biased to a bottom edge portion of the housing member, and having lower thermal conductivity than that of the central heat conductive portion.

Here, the edge heat conductive portion of the battery module according to an embodiment of the present disclosure may be formed to have a material having lower thermal conductivity than that of the central heat conductive portion.

Further, the edge heat conductive portion of the battery module according to an embodiment of the present disclosure is provided with a resin material, or a resin material mixed with a metal material. The edge heat conductive portion may be configured such that the metal material is mixed with the resin material in a ratio, lower than a ratio of the metal material mixed with the central heat conductive portion provided with the resin material mixed with the metal material.

Specifically, the resin material of the battery module according to an embodiment of the present disclosure is a polyurethane resin, the metal material may be aluminum oxide or aluminum hydroxide.

The housing member of the battery module according to an embodiment of the present disclosure includes a sidewall member provided at an edge of the cooling plate member and a compression member provided between the sidewall member and an outermost secondary battery cell, adjacent to the sidewall member. The edge heat conductive portion may be formed by extending the compression member to the cooling plate member.

In addition, the housing member of the battery module according to an embodiment of the present disclosure includes a sidewall member provided at an edge of the cooling plate member, and the edge heat conductive portion is formed to be in contact with bottom surfaces of an outermost secondary battery cell, adjacent to the sidewall and a secondary battery cell, neighboring the outermost secondary battery cell.

Here, the edge heat conductive portion of the battery module according to an embodiment of the present disclosure may be formed of a material of at least 0.5 times smaller than the central heat conductive portion.

The edge heat conductive portion of the battery module according to an embodiment of the present disclosure may be formed of an adhesive material having lower thermal conductivity, than that of the central heat conductive portion.

In addition, the edge heat conductive portion of the battery module according to an embodiment of the present disclosure may be formed of the same material as that of the central heat conductive portion, and pores (gas pockets) may be formed therein.

In addition, the central heat conductive portion of the battery module according to an embodiment of the present disclosure may be formed to have a convex shape with a greater thickness from the bottom edge portion to the central bottom portion.

Further, the edge heat conductive portion of the battery module according to an embodiment of the present disclosure may be formed in a concave shape in which the thickness becomes thinner from the bottom edge portion to the central bottom portion, and may be matched to the central heat conductive portion.

The central heat conductive part of the battery module according to an embodiment of the present disclosure may be formed of material having a thermal conductivity of 2 W/mK or more and 3 W/mK or less.

In addition, the edge heat conductive part of the battery module according to an embodiment of the present disclosure may be formed of a material having a thermal conductivity of 0 W/mK or more and less than 2 W/mK.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity.

The terminology used herein describes particular embodiments only, and the present disclosure is not limited thereby. As used herein, the singular forms "a," "an," and "the" are intended to include the plural forms as well, unless the context clearly indicates otherwise. Further, in the drawings, elements having the same functions within the same scope of the disclosure will be designated by the same reference numerals.

The present disclosure relates to a battery module, in which it is possible to induce uniform cooling between a plurality of secondary battery cells 10. In another aspect, it is possible to optimally form a cooling performance without a waste of a heat conductive member 22.

Figure 1:
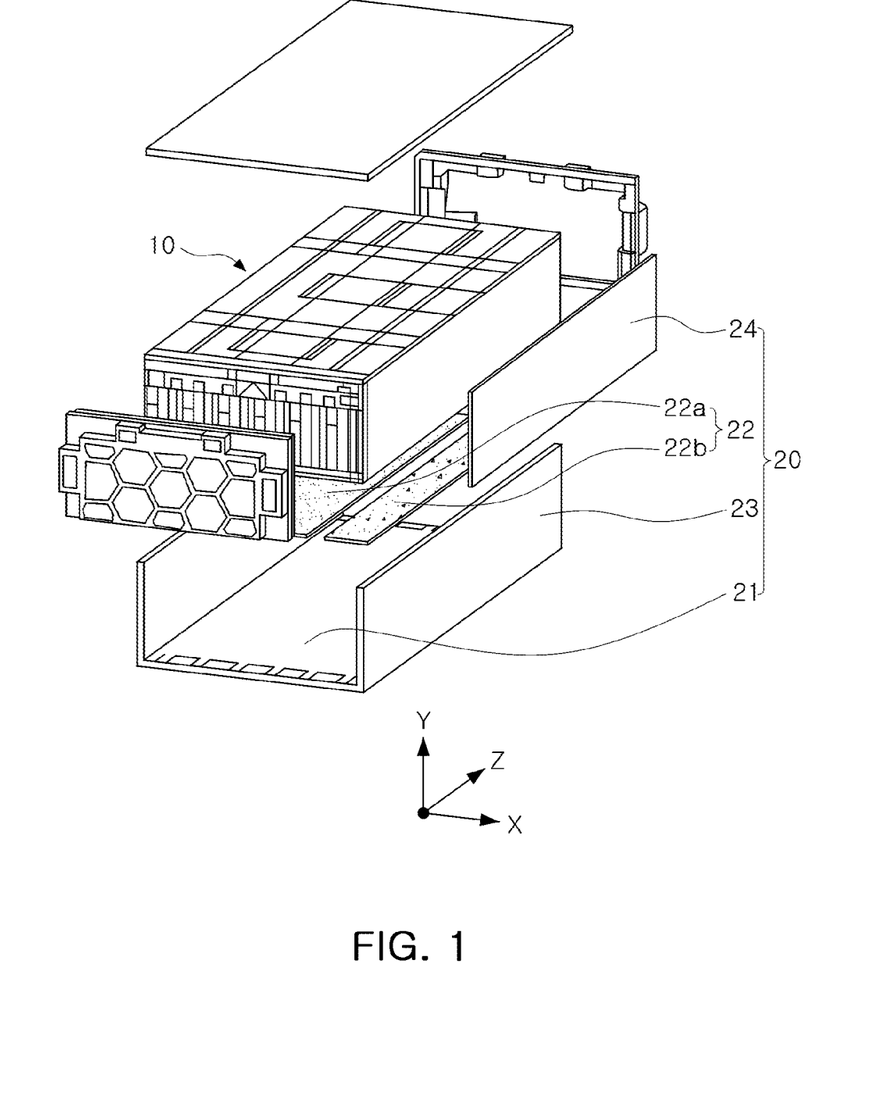
FIG. 1 is a perspective view showing a battery module of the present disclosure.
Figure 2:
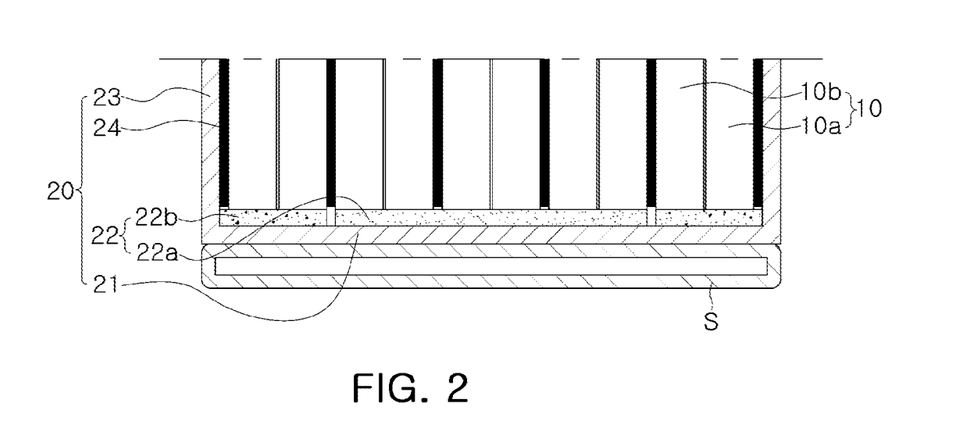
FIG. 2 is a front view showing the battery module of the present disclosure.
Figure 6:
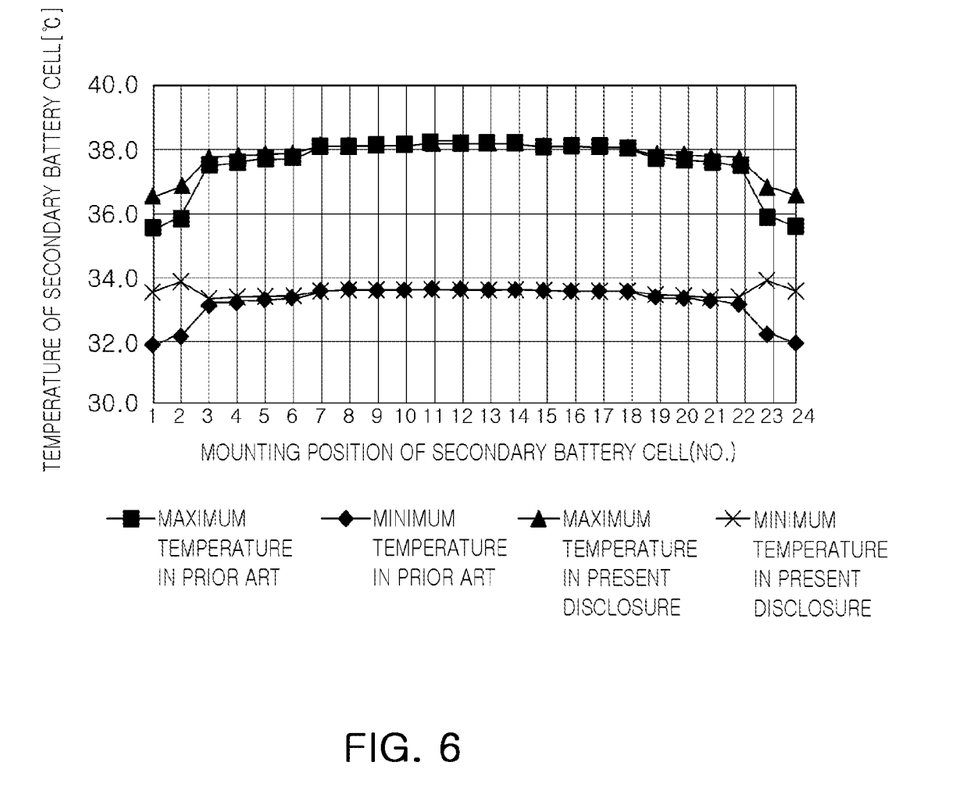
FIG. 6 is a graph showing temperature according to a mounting position of the secondary battery cells.

Specifically, referring to the drawings, FIG. 1 is a perspective view showing the battery module of the present disclosure, FIG. 2 is a front view showing the battery module of the present disclosure, and FIG. 6 is a graph showing a temperature according to a mounting position of the secondary battery cells 10. Referring to the drawings, the battery module according to an embodiment of the present disclosure may include a plurality of secondary battery cells 10; and a housing member 20 including a cooling plate member 21 provided adjacent to the plurality of secondary battery cells 10 and a heat conductive member 22 provided between the secondary battery cells 10 and the cooling plate member 21, to form a heat path for transferring heat from the secondary battery cells 10 to the cooling plate member 21. The housing member 20 may have the plurality of secondary battery cells 10 accommodated therein. The heat conductive member 22 may be provided such that a portion (or part) of it which is in contact with the outermost secondary battery cell 10 that is supercooled has a lower thermal conductivity than that of a remaining portion (or part) thereof. The outermost secondary battery cell 10 may be supercooled because of air cooling due to its proximity to a sidewall 23 of the housing 20.

As described above, in the battery module of the present disclosure, the thermal conductivity of the portion of the heat conductive member in contact with the outermost secondary battery module that is supercooled for transferring heat from the secondary battery cell 10 to the cooling plate member 21 is provided with a lower thermal conductivity than that of another portion thereof. Thus, the supercooled secondary battery cell 10 is cooled with a relatively low efficiency so that the supercooled secondary battery cell 10 is cooled uniformly with the other secondary battery cells 10.

Here, the heat conductive member 22 of the battery module according to an embodiment of the present disclosure, may be formed of a material in which a portion of the plurality of secondary battery cells, in contact with the secondary battery cell 10, that is supercooled, is at least 0.5 times lower than that of other portions in terms of its thermal conductivity.

That is, the heat conductive member 22 may be provided by adjusting the material in order to provide a different thermal conductivity for the portion in contact with the secondary battery cell 10 that is supercooled, and another portion in contact with the remaining of the secondary battery cells.

Specifically, a portion of the heat conductive member that is in contact with the secondary battery cell (or cells) 10 that is supercooled employs a material having thermal conductivity of at least 0.5 times lower than the thermal conductivity of the other portion thereof. It is noted that those secondary battery cells positioned adjacent to the side wall 23 on opposite sides of the housing may be supercooled because of their proximity to the sidewall 23 and air cooling because of ambient air.

That is, the material forming an edge heat conductive portion 22b of the heat conductive member 22 (see FIG. 2) in contact with the outermost secondary battery cell 10a (see FIG. 2) that is supercooled may be limited to a material having thermal conductivity of half or at least half lower than that of the material forming the central heat conductive portion 22a.

For example, when the central heat conductive portion 22a is made of a material having a thermal conductivity of 2 W/mK, the edge heat conductive portion 22b may be formed of a material having thermal conductivity of 1 W/mK.

In another aspect, the heat conductive member 22 of the battery module according to an embodiment of the present disclosure may be configured such that the edge heat conductive portion thereof 22b is formed of the same material as the central heat conductive portion 22 but also includes a plurality of pores or gas pockets.

In other words, to provide the portion 22b in contact with the secondary battery cell 10a that is supercooled to have lower thermal conductivity than the portion 22a the material is not adjusted, but a pore (G) structure is added.

Here, the pores (G) may be provided with a gas such as air, and these gases have low thermal conductivity compared to a heat conductive material forming the heat conductive member 22 such as solid, liquid, or the like. As a result, the thermal conductivity of the portion 22b including the pore (G) structure may be relatively low.

The size and number of the pores (G) structure may be adjusted in order to adjust the thermal conductivity. That is, the thermal conductivity can be lowered by increasing a relative ratio of the area formed by the pores G to the area without pores, or the thermal conductivity can be increased by reducing the relative ratio.

The battery module according to an embodiment of the present disclosure may include a plurality of secondary battery cells 10 and a housing member 20 including a cooling plate member 21 provided adjacent to the plurality of secondary battery cells 10 and a heat conductive member 22 provided between the secondary battery cells 10 and the cooling plate member 21 to form a heat path for transferring heat from the secondary battery cell 10 to the cooling plate member 21, the housing member 20 having the plurality of secondary battery cells 10 accommodated therein.

In other words, the battery module according to the present disclosure is expected to have an effect of cooling the supercooled secondary battery cell 10 with a relatively low efficiency, by providing a thermal conductivity for the edge heat conductive portion 22b in contact with the outermost secondary battery module 10a (that is supercooled) that is lower than that of the central heat conductive portion 22a. As a result, the supercooled secondary battery cell 10a is uniformly cooled with the other secondary battery cells 10.

Here, the reason why supercooling of the secondary battery cell 10a which is in contact with the bottom edge portion, which is an edge portion of the bottom portion of the housing member 20, rather than a secondary battery cell 10, in contact with the bottom central portion, which is a central portion of the bottom portion of the housing member 20, is that the secondary battery cell 10, in contact with the bottom edge portion is provide relatively adjacent to the sidewall member 23 of the housing member 20, thereby improving an effect of air cooling due to external air. This can be more easily confirmed by referring to the graph presented in FIG. 6.

The secondary battery cell 10 is a battery capable of repeating charging and discharging because reciprocal conversion between chemical energy and electric energy is reversible, and is composed of an electrode assembly such as an anode, a cathode, a separator, and an electrolyte and a cell body member protecting the same. The cell body member here may be pouch-shaped or can-shaped.

That is, the cell body member is provided to protect the electrode assembly. That is, the cell body member may provide an inner space for accommodating an electrode assembly composed of an anode, a cathode, a separator, and an electrolyte, and can be presented as a structure sealing after receiving the electrode assembly.

For example, the cell body member may be provided as a pouch-shaped member or a can-shaped member. Here, the pouch-shaped member is configured to seal and receive the electrode assembly on three surfaces, and is a member being mainly configured to be sealed by overlapping three surfaces of the upper surface portion and both side surface portions, except for one surface portion, which is a mainly lower surface portion, in a state in which the electrode assembly is accommodated therein. The can-shaped member is configured to seal and receive the electrode assembly on one surface, is a member being mainly configured to be sealed by overlapping one surface of the upper surface portion except for three surfaces, which are the bottom surface portion and both side surface portions, in a state in which the electrode assembly is accommodated therein.

The electrode assembly substantially includes an electrolyte and is used to be accommodated in the cell body member. The electrolyte may include lithium salts such as $LiPF_6$, $LiBF_4$, or the like, in organic solvents such as ethylene carbonate (EC), propylene carbonate (PC), diethyl carbonate (DEC), ethyl methyl carbonate (EMC), dimethyl carbonate (DMC), and the like. Furthermore, the electrolyte may be a liquid, solid or gel-type.

The housing member 20 serves as a body of a battery module in which the plurality of secondary battery cells 10 are accommodated.

That is, the housing member 20 has a configuration in which a plurality of secondary batteries are installed, and serves to protect the secondary battery while transferring an electric energy generated by the secondary battery to the outside or transferring an electric energy from the outside to the secondary battery.

Here, the housing member 20 may be provided with the cooling plate member 21 and may be configured to transfer heat generated in the secondary battery to an external heat sink S to be cooled, and a bottom portion forming a lower portion of the housing member 20 may be composed of the cooling plate member 21.

In addition, a sidewall member 23 forming a side portion of the housing member 20 may be provided at an edge portion of the cooling plate member 21 provided in a bottom portion, and the cooling plate member 21 may be formed to extend the sidewall member 23.

A compression member 24 may be provided on an inner side surface of the side wall member 23 to more securely protect the secondary battery.

Here, the compression member 24 may be configured to extend to the bottom portion, a detailed description thereof will be described later with reference to FIG. 3.

In addition, the housing member 20 may be configured to protect an upper end portion of the secondary battery, including a cover member provided on an upper end of the sidewall member 23.

The housing member 20 may be provided with an additional configuration, such as a bus bar, or the like, for electrically connecting the secondary battery externally.

The housing member 20 may include a heat conductive member 22 provided between the secondary battery cell 10 and the cooling plate member 21, to form a heat path for transferring heat from the secondary battery cell 10 to the cooling plate member 21.

That is, the heat conductive member 22 serves to transfer heat generated during charging and discharging of the electrode assembly to the heat sink S. To this end, the heat conductive member 22 may be provided between the cell body members in which the electrode assembly is accommodated and the cooling plate member 21 in contact with the heat sink S.

The heat conductive member 22 may be configured to have different thermal conductivity for each part (22a and 22b) to optimize the cooling performance. Moreover, uniform cooling of the plurality of secondary battery cells 10 may be achieved.

To this end, the heat conductive member 22 may be configured to have a portion 22b which is in contact with the secondary battery cell 10a that is supercooled having lower thermal conductivity than a remaining portion 22b of the heat conductive member 22. In the described embodiment of in FIG. 1, the heat conductive member 22 has the edge heat conductive portion 22b and a central heat conductive portion 22a. The thermal conductivity of the edge heat conductive portion 22b is lower than that of the central heat conductive portion 22a. The central heat conductive portion 22a is provided to be biased to the bottom central portion. The edge heat conductive portion 22b is provided by being biased to the bottom edge portion in which supercooling by external air is expected.

Here, the heat conductive member 22 may be provided by adjusting the material to form different thermal conductivity for each part.

That is, the edge heat conductive portion 22b of the battery module according to an embodiment of the present disclosure may be formed of a material having lower thermal conductivity than that of the central heat conductive portion 22a.

Any suitable materials may be used for the edge heat conductive portion 22b and the central heat conductive portion 22a of the present disclosure as long as the physical properties of thermal conductivity are adjusted to be different with the thermal conductivity of the edge heat conductive portion 22b being lower than the thermal conductivity of the central heat conductive portion 22a. In an embodiment, the edge heat conductive portion 22b and the central heat conductive portion 22a are made of different materials so that the thermal conductivity of the edge heat conductive portion 22b is at least half of the thermal conductivity of the central heat conductive portion 22a.

For example, the edge heat conductive portion 22b of the battery module according to an embodiment of the present disclosure may be provided with a resin material or a resin material mixed with a metal material, and the edge heat conductive portion 22b may be configured such that the metal material is mixed with the resin material in a ratio, lower than a ratio of the metal material mixed with the central heat conductive portion provided with the resin material mixed with the metal material.

In other words, since the thermal conductivity of the metal material is greater than the thermal conductivity of the resin material, it is possible to adjust a mixing ratio of the metal materials to adjust the thermal conductivity of the mixed material of the resin material and the metal material.

For example, the resin material of the battery module according to an embodiment of the present disclosure may be a polyurethane resin and the metal material may be aluminum oxide or aluminum hydroxide.

Further, titanium dioxide, or the like, which is an additive for securing fluidity, may be further mixed with the mixed material of the resin material and the metal material.

The mixed material in which the thermal conductivity is adjusted as described above may be provided by being applied differently to the central heat conductive portion 22a and the edge heat conductive portion 22b to obtain the desired thermal conductivities for these parts.

Here, the edge heat conductive portion 22b of the battery module according to an embodiment of the present disclosure may be formed of a material at least 0.5 times lower than that of the central heat conductive portion 22a.

That is, the material forming the edge heat conductive portion 22b is a material having thermal conductivity of at least half lower than that of the material forming the central heat conductive portion 22a.

For example, when the central heat conductive portion 22a is formed of a material having a thermal conductivity of 2 W/mK, the edge heat conductive portion 22b may be formed of a material having a thermal conductivity of 1 W/mK.

In an embodiment, the central heat conductive portion 22a of the battery module according to an embodiment of the present disclosure may be formed of a material having a thermal conductivity of 2 W/mK or more and 3 W/mK or less.

The edge heat conductive portion 22b of the battery module according to an embodiment of the present disclosure may be formed of a material having a thermal conductivity of 0 W/mK or more and less than 2 W/mK.

That is, a material may be formed by setting the thermal conductivity of the central heat conductive portion 22a and the edge heat conductive portion 22b such that the edge heat conductive portion 22b has thermal conductivity lower than that of the central heat conductive portion 22a.

Accordingly, the heat conductive member 22 may lower an effect of the secondary battery cell 10, in contact with the edge heat conductive portion 22b that is mainly supercooled among the plurality of secondary battery cells 10 being cooled by heat exchange with the cooling plate member 21, such that cooling imbalance with the secondary battery cell 10, in contact with the central heat conductive portion 22a may be adjusted.

The edge heat conductive portion 22b of the battery module according to an embodiment of the present disclosure may be formed of an adhesive material having thermal conductivity lower than that of the central heat conductive portion 22a.

In other words, the edge heat conductive portion 22b is provided in contact with the secondary battery cell 10 and the cooling plate member 21, and may also be formed of an adhesive material for attaching the secondary battery cell 10 to the cooling plate member 21.

Moreover, since the adhesive material forming the edge heat conductive portion 22b has lower thermal conductivity than the heat conductive material forming the central heat conductive portion 22a, the material is disposed adjacent to the sidewall member 23, but the secondary battery cell 10a, in contact with the edge heat conductive portion 22b can be prevented from being overcooled compared to the secondary battery cell 10, in contact with the central heat conductive portion 22a.

In addition, the housing member 20 of the battery module according to an embodiment of the present disclosure may include a sidewall member 23 provided at an edge of the cooling plate member 21, and the edge heat conductive member 22b may be formed to be in contact with bottom surfaces of the outermost secondary battery cell 10a, adjacent to the sidewall member 23 and the secondary battery cell 10b.

The edge heat conductive portion 22b is formed to extend in contact with only the bottom surfaces of the outermost secondary battery cell 10a and the secondary battery cell 10b that is adjacent to the outmost secondary battery cell 10a, which is mainly because an effect of supercooling of the outside air through the sidewall member 23 extends to the outermost secondary battery cell 10a and the secondary battery cell 10b that is adjacent to the outmost secondary battery cell 10a.

This can be confirmed more easily by referring to the graph presented in FIG. 6. That is, in the data according to the prior art, it is possible to confirm the supercooling of the first and 24th outermost secondary battery cells 10a and the second and 23rd secondary battery cells 10b disposed adjacent to the sidewall members 23.

On the other hand, when the battery module of the present disclosure is applied, it can be confirmed that uniform cooling is performed by improving the problems of supercooling in the first and 24th outermost secondary battery cells 10a and the second and 23rd secondary battery cells 10b compared to other secondary battery cells 10.

Figure 3:
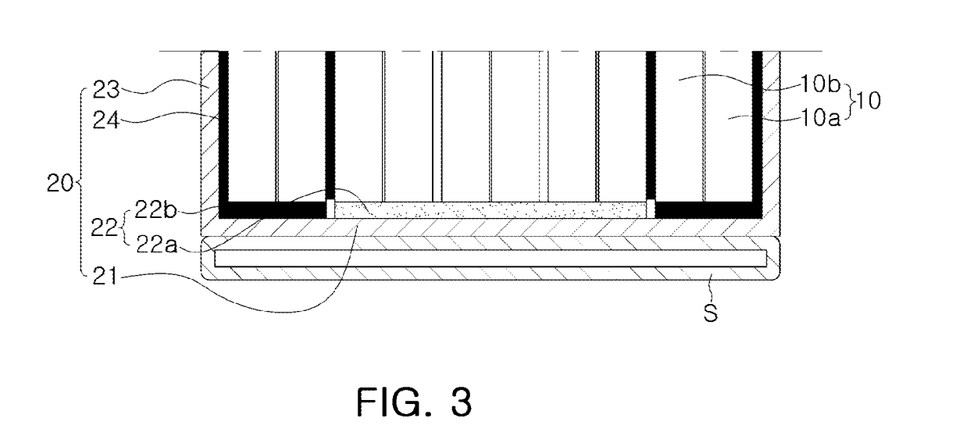
FIG. 3 is a front view showing an embodiment in which a compression member is extended from the battery module of the present disclosure to an edge heat conductive part.

FIG. 3 is a front view illustrating an embodiment in which a compression member 24 extends to an edge heat conductive portion 22b in the battery module of the present disclosure. Referring to FIG. 3, the housing member of the battery module of the present disclosure may include a sidewall member 23 provided at an edge of the cooling plate member 21 and a compression member provided between the sidewall member 23 and an outermost secondary battery cell 10a, adjacent to the sidewall member 23, wherein the edge heat conductive portion 22b may be formed by extending the compression member 24 to the cooling plate member 21.

In other words, the compression member 24 may extend to the bottom portion to form the edge heat conductive portion 22b. Thus, it is possible to more securely protect the secondary battery cell 10a, adjacent to the sidewall member 23 while preventing overcooling of the secondary battery cell 10a, adjacent to the sidewall member 23.

That is, since the compression member 24 is made of a material having lower thermal conductivity than that of the heat conductive material forming the central heat conductive portion 22a, when the material forming the compression member 24 is provided to extend to the edge heat conductive portion 22b, the secondary battery cell 10a, in contact with the edge heat conductive portion 22b has a lower rate of heat transfer to the cooling plate member 21, so that a problem in which the secondary battery cell 10a, in contact with the edge heat conductive portion 22b is supercooled by being adjacent to the sidewall member 23 may be prevented.

Figure 4:
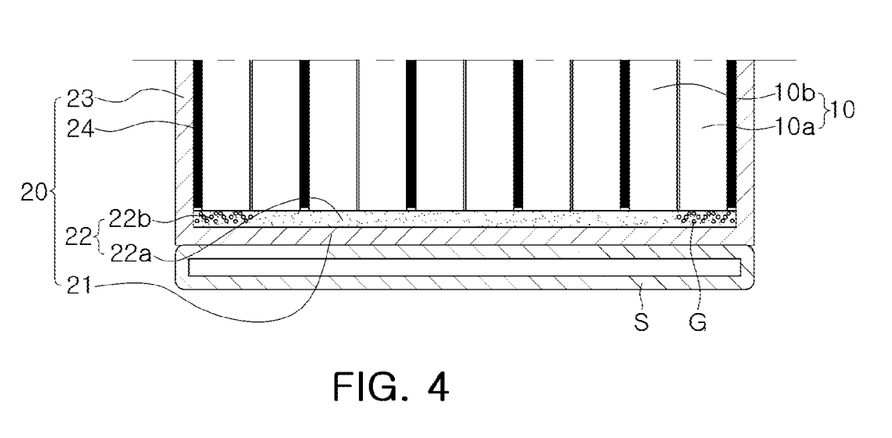
FIG. 4 is a front view showing an embodiment of an edge heat conductive part having the same material as a central heat conductive part in the battery module of the present disclosure and having pores formed therein.

FIG. 4 is a front view illustrating an embodiment of an edge heat conductive portion 22b having the same material as the central heat conductive portion 221 and pores G formed in the battery module of the present disclosure. Referring to FIG. 4, the edge heat conductive portion 22b of the battery module according to an embodiment of the present disclosure may be formed of the same material as that of the central heat conductive portion 22a, and pores G (gas pockets) may be formed therein.

In other words, in order to provide the edge heat conductive portion 22b with thermal conductivity, lower than that of the central heat conductive portion 22a, the material is not adjusted, but a pore (G) structure is added.

Here, the pore G is provided with a gas such as air, and the gas has lower thermal conductivity as compared to a heat conductive material forming the central heat conductive portion 22a, such as solid, liquid, or the like, and as a result, the thermal conductivity of the edge heat conductive portion 22b including the structure is relatively low.

Here, the size and number of the pores (G) structure may be adjusted in order to adjust the thermal conductivity of the edge heat conductive portion 22b. That is, the thermal conductivity of the edge heat conductive portion 22b may be reduced by increasing a relative ratio of the area formed by the pores G to the non-pore area in the edge heat conductive portion 22b, or the relative ratio may be reduced to increase the thermal conductivity of the edge heat conductive portion 22b.

Figure 5:
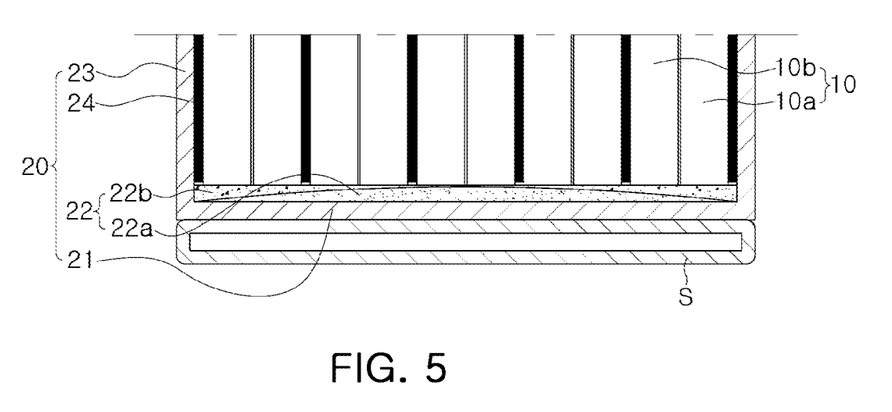
FIG. 5 is a front view showing an embodiment of a form in which the central heat conductive part and the edge heat conductive part are overlapped in the battery module of the present disclosure, but a ratio occupied by the edge heat conductive portion gradually increases from a bottom center part to a bottom edge part.

FIG. 5 is a front view illustrating an embodiment in which a central heat conductive portion 22a and an edge heat conductive portion 22b are formed to overlap in the battery module in the present disclosure, and in which a ratio in terms of occupancy of the edge heat conductive portion 22b to the central heat conductive portion 22a gradually increases from the bottom central portion to the bottom edge portion. Referring to FIG. 5, the central heat conductive portion 22a of the battery module according to an embodiment of the present disclosure may be formed to have a convex shape in which the thickness increases from the bottom edge portion to the bottom central portion.

In other words, the material and the structure of the heat conductive member 22 are limited so as to generate a gradual difference in thermal conductivity in a direction away from the sidewall member from a region adjacent to the sidewall member where supercooling by external air is performed.

According to this, by gradually adjusting the cooling performance from the secondary battery cell 10a adjacent to the sidewall member to the secondary battery cell 10 disposed away from the sidewall member, a uniform cooling effect between the plurality of secondary battery cells 10 can be increased even further.

As a structure therefor, the cross-section of the central heat conductive portion may be configured to be convex.

In addition, corresponding thereto, a cross-section of the edge conductive portion 22b may be configured to have a concave shape.

That is, the edge heat conductive portion 22b of the battery module according to an embodiment of the present disclosure is formed to have a concave shape in which the thickness becomes thinner from the bottom edge portion to the bottom central portion, and may be matched to the central heat conductive portion 22a.

As set forth above, according to the present disclosure, the battery module may induce uniform cooling between the plurality of secondary battery cells.

In another aspect, the battery module of the present disclosure has an advantage of optimally forming a cooling performance without wasting a heat conductive member.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

While example embodiments have been shown and described above, it will be apparent to those skilled in the art that modifications and variations could be made without departing from the scope of the present inventive concept as defined by the appended claims.

What is claimed is:

1. A battery module, comprising:
   a plurality of secondary battery cells; and
   a housing member including a cooling plate member provided adjacent to the plurality of secondary battery cells and a heat conductive member provided between the secondary battery cells and the cooling plate member, to form a heat path for transferring heat from the secondary battery cells to the cooling plate member, the housing member having the plurality of secondary battery cells accommodated therein,
   wherein the heat conductive member comprises a central heat conductive portion and an edge heat conductive portion, the edge heat conductive portion having a lower thermal conductivity than the central heat conductive portion, and
   wherein the central heat conductive portion is biased to a bottom central portion and the edge heat conductive portion is biased to a bottom edge portion.

2. The battery module of claim 1, wherein the edge heat conductive portion is formed of a material having thermal conductivity lower than that of the central heat conductive portion.

3. The battery module of claim 2, wherein the edge heat conductive portion comprises a resin material mixed with a metal material, and is provided such that a ratio of the metal material to the resin material is lower than the ratio of the metal material to the resin material in the central heat conductive portion.

4. The battery module of claim 3, wherein the resin material is a polyurethane resin, and the metal material is aluminum oxide or aluminum hydroxide.

5. The battery module of claim 1, wherein the housing member comprises a sidewall member disposed at an edge of the cooling plate member; and
   a compression member disposed between the sidewall member and an outermost secondary battery cell, adjacent to the sidewall member,
   wherein the edge heat conductive portion is formed by extending the compression member to the cooling plate member.

6. The battery module of claim 1, wherein the housing member comprises a sidewall member disposed at an edge of the cooling plate member,
   wherein the edge heat conductive portion is in contact with bottom surfaces of an outermost secondary battery cell, adjacent to the sidewall member and an adjacent secondary battery cell neighboring the outermost secondary battery cell.

7. The battery module of claim 1, wherein the edge heat conductive portion comprises a material having thermal conductivity of at least 0.5 times lower than that of the central heat conductive portion.

8. The battery module of claim 1, wherein the edge heat conductive portion comprises an adhesive material having thermal conductivity lower than that of the central heat conductive portion.

9. The battery module of claim 1, wherein the edge heat conductive portion comprises the same material as that of the central heat conductive portion and includes pores or gas pockets formed therein.

10. The battery module of claim 1, wherein the central heat conductive portion is formed to have a convex shape with a greater thickness from the bottom edge portion to the bottom central portion on a surface facing the edge heat conductive portion.

11. The battery module of claim 10, wherein the edge heat conductive portion is formed to have a concave shape in which the thickness is reduced from the bottom edge portion to the bottom central portion on a surface facing the central heat conductive portion, and is matched to the central heat conductive portion.

12. The battery module of claim 1, wherein the central heat conductive portion comprises a material having a thermal conductivity of 2 W/mK or more.

13. The battery module of claim 12, wherein the edge heat conductive portion comprises a material having a thermal conductivity of 0 W/mK or more and less than 2 W/mK.

* * * * *